(12) United States Patent
Gungabeesoon et al.

(10) Patent No.: US 11,372,639 B2
(45) Date of Patent: Jun. 28, 2022

(54) SYSTEM AND METHOD FOR AUTOMATED MICROSERVICE SOURCE CODE GENERATION AND DEPLOYMENT

(71) Applicant: NEXT PATHWAY INC., Toronto (CA)

(72) Inventors: Satish Gungabeesoon, Markham (CA); Zhe Yang, North York (CA)

(73) Assignee: Next Pathway Inc., Toronto (CA)

( * ) Notice: Subject to any disclaimer, the term of this patent is extended or adjusted under 35 U.S.C. 154(b) by 0 days.

(21) Appl. No.: 17/079,178

(22) Filed: Oct. 23, 2020

(65) Prior Publication Data

US 2021/0124576 A1 Apr. 29, 2021

Related U.S. Application Data

(60) Provisional application No. 62/925,403, filed on Oct. 24, 2019.

(51) Int. Cl.
*G06F 8/71* (2018.01)
*G06F 8/60* (2018.01)
*G06F 11/36* (2006.01)
*G06F 8/20* (2018.01)
*G06F 8/38* (2018.01)

(52) U.S. Cl.
CPC .............. *G06F 8/71* (2013.01); *G06F 8/24* (2013.01); *G06F 8/38* (2013.01); *G06F 8/60* (2013.01); *G06F 11/3688* (2013.01); *G06F 11/3692* (2013.01)

(58) Field of Classification Search
CPC ..... G06F 8/71; G06F 8/24; G06F 8/38; G06F 8/60; G06F 11/3688; G06F 11/3692

USPC .................................................. 717/101–122
See application file for complete search history.

(56) References Cited

U.S. PATENT DOCUMENTS

| | | | | |
|---|---|---|---|---|
| 6,536,037 B1 * | 3/2003 | Guheen | ..................... | G06F 8/71 703/2 |
| 6,694,508 B1 * | 2/2004 | Moore | ..................... | G06F 8/71 717/121 |
| 7,320,120 B2 * | 1/2008 | Rajarajan | ................... | G06F 8/20 717/104 |

(Continued)

OTHER PUBLICATIONS

Ma et al, "Using Service Dependency Graph to Analyze and Test Microservices", IEEE, pp. 81-86 (Year: 2018).*

(Continued)

*Primary Examiner* — Anil Khatri
(74) *Attorney, Agent, or Firm* — Fish & Richardson P.C.

(57) ABSTRACT

A system and method to automatically generate source code for a software microservice executable in a computing environment. A configuration specification defining the characteristics of the microservice is received. Based on the specification, at least one pattern template for the microservice is selected from a repository of templates. The pattern templates provide source code patterns usable to build the microservice. A first set of source code for a first software project is outputted and corresponds to a first aspect of the microservice, the first aspect including a definition for an interface. A second set of source code for a second software project is also outputted that corresponds to a second aspect of the microservice, the second aspect relates to a function of the microservice.

21 Claims, 3 Drawing Sheets

(56) References Cited

U.S. PATENT DOCUMENTS

| | | | | |
|---|---|---|---|---|
| 7,640,533 | B1* | 12/2009 | Lottero | G06F 8/71 |
| | | | | 717/108 |
| 7,716,254 | B2* | 5/2010 | Sarkar | G06Q 10/06 |
| | | | | 717/104 |
| 7,890,924 | B2* | 2/2011 | Raffo | G06Q 10/06 |
| | | | | 717/113 |
| 7,949,997 | B2* | 5/2011 | Chessell | G06F 8/20 |
| | | | | 717/109 |
| 8,271,949 | B2* | 9/2012 | Bernardini | G06F 11/3612 |
| | | | | 717/124 |
| 8,566,777 | B2* | 10/2013 | Chaar | G06Q 10/06 |
| | | | | 717/101 |
| 8,745,583 | B2* | 6/2014 | Ronen | G06F 16/90 |
| | | | | 717/125 |
| 9,043,458 | B2* | 5/2015 | Balaji | H04L 67/2833 |
| | | | | 709/224 |
| 10,001,975 | B2* | 6/2018 | Bharthulwar | G06F 8/10 |
| 10,055,200 | B1* | 8/2018 | Russell | G06F 11/3696 |
| 10,255,413 | B2* | 4/2019 | Gaur | G06F 21/57 |
| 10,430,250 | B2* | 10/2019 | Ishikawa | G06F 9/44505 |
| 10,684,940 | B1* | 6/2020 | Kayal | G06F 11/3664 |
| 10,713,664 | B1* | 7/2020 | Alagappan | G06F 40/205 |
| 11,068,261 | B1* | 7/2021 | Katdare | G06F 8/77 |

OTHER PUBLICATIONS

Ponce et al, "Migrating from monolithic architecture to microservices: A Rapid Review", IEEE, pp. 1-7 (Year: 2019).*

Mazlami et al., "Extraction of Microservices from Monolithic Software Architectures", IEEE, pp. 524-531 (Year: 2017).*

Granchelli et al., "A Software Architecture Recovery Tool for Maintaining Microservice-based Systems", IEEE, pp. 298-302 (Year: 2017).*

Jin et al, "Functionality-oriented Microservice Extraction Based on Execution Trace Clustering", IEEE, pp. 211-218 (Year: 2018).*

Dümann et al., "Model-driven Generation of Microservice Architectures for Benchmarking Performance and Resilience Engineering Approaches", ACM, pp. 171-172 (Year: 2017).*

Sorgalla et al, "AjiL: Enabling Model-driven Microservice Development", ACM, pp. 1-4 (Year: 2018).*

Klock et al, "Workload-based Clustering of Coherent Feature Sets in Microservice Architectures", IEEE, pp. 11-20 (Year: 2017).*

* cited by examiner

SYSTEM AND METHOD FOR AUTOMATED MICROSERVICE SOURCE CODE GENERATION AND DEPLOYMENT

CROSS-REFERENCE TO RELATED APPLICATION

This application claims the benefit of U.S. Provisional Patent Application No. 62/925,403, filed Oct. 24, 2019, which is incorporated by reference.

TECHNICAL FIELD

The present disclosure relates generally to automated source code generation, and more specifically to a method and system for automated microservice source code generation, and for testing and deployment of microservices.

BACKGROUND

Advancements in cloud-based technologies have enabled the establishment of highly versatile and scalable computing systems. Such systems are appealing to business users who desire to maintain and operate their corporate and enterprise data systems within distributed computing environments. Within such environments, there is a trend to develop computing services using the microservice architecture, in contrast to a monolithic architecture, because the microservice architecture provides scalability of available functions and shorter development and deployment cycles.

It is often a challenge for an enterprise to adopt and implement the microservice architecture and deliver highly reusable context bounded microservices which follow enterprise application programming interface ("API") and application standards, microservice architecture principles, microservice design patterns, and microservice best practices for a number of reasons, as explained more fully below.

Firstly, manual microservice application design and development procedures too often do not consistently follow microservice design patterns, microservice application coding standards, and enterprise application standards. Traditional monolithic application delivery methodologies are not applicable to microservice delivery projects which deliver multiple business context-bounded microservices for the same business application.

Secondly, the microservice architecture is often new to most enterprise application delivery teams because such teams traditionally design and develop monolithic applications to meet business requirements. The microservice architecture focuses on rapid delivery of defined microservices within a bounded business context to speed up delivery of business applications. The skills and experiences acquired for designing and developing monolithic applications are often not suitable or sufficient for designing and developing microservices. Thus, the microservices designed by developers with little to no microservices development knowledge and industry experience do not follow consistent microservices development standards even if they are aware that they are supposed to follow and implement delivery of microservices based on recognized design patterns. As a result, the cost of support and maintenance is difficult to control in such instances.

Accordingly, in view of the foregoing deficiencies, there is a need for a system and method to accelerate the generation and deployment microservices that meet accepted microservices development practices and standards.

SUMMARY OF THE DISCLOSURE

In general, the present specification describes a system and method to automatically generate source code for microservices delivery and deployment in order to accelerate and standardize the microservice development lifecycle.

According to one aspect of the invention, there is provided a method to automatically generate a software microservice operable in a computing environment, the method includes providing a configuration specification defining the software microservice; selecting at least one pattern template for the software microservice defined by the configuration specification; outputting a first set of source code for a first software project corresponding to a first aspect of the software microservice using the selected at least one pattern template; and outputting a second set of source code for a second software project corresponding to a second aspect of the software microservice.

In some embodiments, the first set of source code implements at least one computing system interface for the software microservice for communicating with a component of the computing environment.

In some embodiments, the first software project is a locked project such that a user is not permitted to make changes to the project.

In some embodiments, the configuration specification includes at least one data transformation rule for transforming data received by the software microservice.

In some embodiments, the pattern templates describe at last one of microservice layouts, integration flow, and designs.

In some embodiments, the at least one pattern template includes a first group of templates for use in a first software development framework, and a second group of templates for second software development framework.

In some embodiments, the configuration specification includes at least one data transformation rule for transforming data by the software microservice, the data being received by the software microservice.

In some embodiments, the second software project is configured to receive a third set of source code for incorporation into the second software project, the third set of source code defining at least one function of the microservice.

In some embodiments, the second set of source code is generated based on a configuration specification defining the software microservice.

In some embodiments, the method further includes the step of validating the configuration specification prior to selecting the at least one pattern template.

In some embodiments, the method further includes the step of building the first software project and second software project to a single binary object corresponding to the software microservice.

In some embodiments, the method further includes the step of testing the software microservice upon deploying the binary objects.

According to another aspect of the invention, there is provided a system to automatically generate a software microservice operable in a computing environment, the system includes a microservice interface specification review pipeline operable to receive a microservice interface specification defining the software microservice; and a microservice delivery pipeline operable to: select at least one pattern template for the software microservice defined by a configuration specification of the software microservice; output a first set of source code for a first software project corresponding to a first aspect of the software microservice using the selected at least one pattern template; and output a second set of source code for a second software project corresponding to a second aspect of the software microservice.

In some embodiments, the microservice delivery pipeline is generated based on one or more pipeline generation templates.

In some embodiments, the system further includes a microservice source code generator, the generator is invokable by the microservice delivery pipeline to generate the first set of source code and the second set of service code.

In some embodiments, the system further includes a code versioning system to store the first software project and the second software project.

In some embodiments, the system further includes an integrated development environment (IDE) providing a graphical user interface (GUI) for inputting the microservice interface specification and the configuration specification by a user for generating the first set of source code and the second set of source code.

In some embodiments, the IDE is further configurable to invoke at least one of the microservice interface specification review pipeline and the microservice delivery pipeline.

In some embodiments, the IDE is a web-based IDE that comprises a web-based GUI provided by an associated server application.

In some embodiments, the microservice interface specification review pipeline triggers generation of the microservice delivery pipeline.

In some embodiments, the service delivery pipeline is further operable to build the first software project and second software project to binary objects corresponding to the software micro service.

In some embodiments, the first set of source code implements at least one computing system interface for the microservice for communicating with a component of the computing environment.

In some embodiments, the configuration specification includes at least one data transformation rule for transforming data by the software service, the data being exchanged between a first computing system and a second computing system Additional aspects of the present invention will be apparent in view of the description which follows.

BRIEF DESCRIPTION OF THE DRAWINGS

Features and advantages of the embodiments of the present invention will become apparent from the following detailed description, taken with reference to the appended drawings in which.

DETAILED DESCRIPTION

Figure 1:
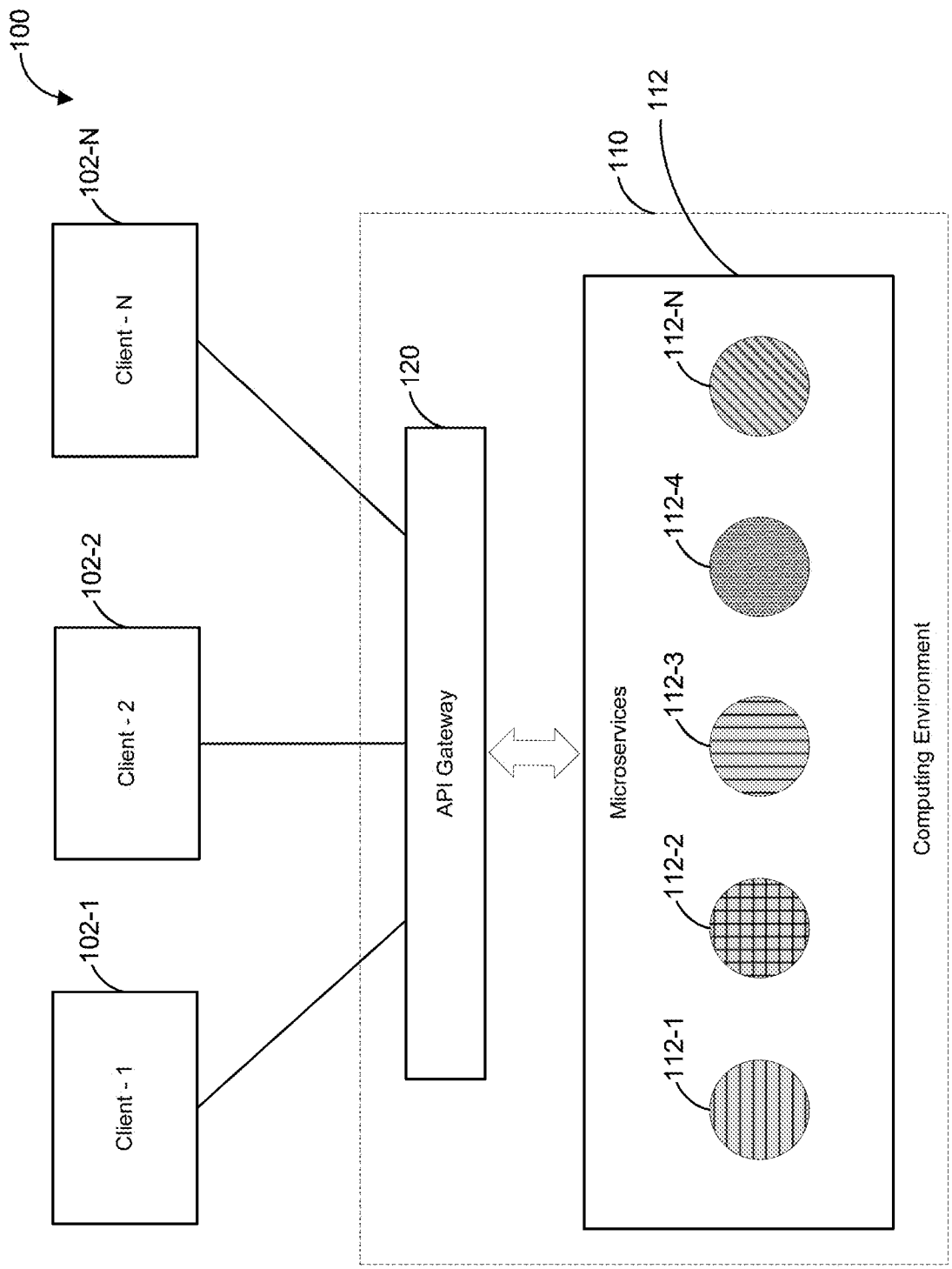
FIG. 1 is a block diagram of a microservices architecture within a computing environment.

The description which follows, and the embodiments described therein, are provided by way of illustration of examples of particular embodiments of the principles of the present invention. These examples are provided for the purposes of explanation, and not limitation, of those principles and of the invention.

For the purposes of the present disclosure, a microservice architecture, in contrast to a monolithic architecture, allows applications to be constructed as independent context-bounded collaborating units, where each unit is separately deployable and maintainable. Each such unit can be referred to as a "microservice". The microservice can be regarded as software modules with well-defined interface operations (i.e. functions), referred to as application programming interfaces ("APIs"), for use within a computing environment. The APIs can conform to the well-known representational state transfer software architecture style and may be referred to as a REST or RESTful API.

The bounded context of a microservice can be derived through a process of capability decomposition of higher-level business operations, where each sub or sub-sub capability or function is used to define the functional boundary of the microservice. For example, within an enterprise e-commerce environment, microservices can be deployed for specific tasks or functions such as user authentication, payment processing, and inventory maintenance. Each of these tasks can be further decomposed in respect of additional functional capabilities to further narrow the scope of functionality of the microservice. It is generally up to the application architect to define the level of granularity of the bounded contexts. The bounded contexts generally need to define atomically self-sufficient granular functions, which can then be independently implemented, managed, and deployed.

The bounded context of a microservice also isolates and defines the responsibility of the microservice, allowing the microservice to follow a development life cycle that is focused on its specific task. As such, the microservice can be evolved at a pace that is independent from other components of the larger application that it contributes to. In this regard, the microservice approach lends itself to the loosely-coupled working parts and separation-of-tasks approach inherent in SOA (Service-Oriented Architecture) application design principles.

The microservice architecture enables the continuous delivery/deployment of large, complex applications that are composed of individual microservices. Updates or modifications applied to the codebase of one microservice would not affect the function and operation of other microservices within the overall application. Applications built from microservices therefore allow development teams to reduce the complexity of large applications into manageable working and functional parts. Large applications composed of microservices can evolve at an atomic, functional level, incrementally in an agile manner, at the same pace as requirements change.

Microservices are typically implemented by developers coding the entire microservice without abstracting out and templating the common infrastructure components of specific types of microservices. This approach leads to the developer having to acquire software development skills specific to the details of the microservice capabilities and coding. The abstraction of microservices, that is, separation of the microservice machinery (i.e. infrastructure elements such as the microservice interface and its ability to leverage the runtime platform) from its business functions, is a non-obvious approach and task, and requires a non-trivial architecture solution.

Development of a microservice solution often needs to take into consideration of at least the following aspects:

Decompose a business application into its context bounded domains, sub-domains, or generally sub-sub-domains following an industry standard enterprise domain classification framework;

Abstract the common building blocks of a microservice from its application functional aspects;

Handle the intake of functional and non-functional parameters;

Allow the parameterized generation of any type of microservices;

Follow industry standards, policies and best practices typically used for the development of microservices;

Embed specific enterprise-level and configurable security enablements such as masking of sensitive customer or user data per individual enterprise practice and maintaining PCI DSS (Payment Card Industry Data Security Standard) compliance;

Embed configurable validation rules, application logic, and configurable error handling exits;

Allow the ability to orchestrate the tracking of calls to downstream service providers that feed into the functional capability of the microservice being generated/developed;

Automate the development lifecycle of microservice creation, including generation, testing, versioning, code quality and security scanning, promotion, and deployment; and Regeneration of a microservice without losing prior post-generation application functional code changes.

Disclosed herein is a system and method that automates microservice generation and delivery, and which accelerates and standardizes microservice delivery by automating microservice configuration, microservice source code generation, source code unit testing, microservice build, microservice deployment, microservice testing, microservice promotion, and microservice governance throughout the lifecycle of a microservice delivery project from its inception to production launch. The system may be deployed as a microservice factory ("MSF") platform which takes into consideration of at least the factors previously identified in connection with the automatic generation and delivery of microservices.

As will be described in greater detail below, the MSF platform is an automated microservice delivery platform built on Development and Operations or DevOps continuous integration ("CI") pipelines to activate a microservice source code generator to generate wellformed and standardized microservices in a specified source code (e.g. Java™, Python™, and the like) based on industry-standard design patterns and best practices. The MSF platform is operable to separate non-functional "infrastructure" code and core functional "business logic" code to help alleviate microservice developers from time-consuming, tedious and error-prone manual and repeated microservice infrastructure source coding. This separation is expected to allow these developers to focus on coding the specific business logic (i.e. the tasks/functions the microservice is intended to carry out), and data mapping rules for the microservice APIs. The code of the microservices generated by the microservice generator, described in greater detail below, follows consistent design and coding standards whenever the microservice's design and implementation are based on the same integration design patterns, thereby reducing the cost of support and maintenance following deployment.

Referring first to FIG. 1, shown therein is a block diagram of a typical arrangement 100 in which one or more microservices 112 are deployed within a target computing environment 110. Depicted in FIG. 1 are N microservices identified using reference numerals 112-1 through 112-N (collectively, 112). Each of the microservices 112, as noted above, is a small autonomous service in which each service is self-contained and provides a defined function. Each of the microservices 112 can be created under a separate codebase that can be managed by different development teams. The developers of the microservices 112 specify an interface such as an application programming interface to allow access to the functionalities provided by each of the microservices 112. As in the e-commerce example noted above, each of the microservices 112 can be dedicated to a specific function such as account services, inventory services, shipping services, security services and the like. For the purpose of this disclosure, a "service" can be used interchangeably with "microservice" to describe a software process, software application, application programming interface and the like that provide particular functionalities such as communication and access to one or more computing resource, computing functionalities and or computing systems. For example, each of the microservices 112 can take the form a web service within a web environment, or a data service within an enterprise data warehouse environment.

The microservices 112 are accessible by clients 102 via an API gateway 120. The API gateway 120 functions as the entry point for the clients 102 to access the microservices 112. The gateway can be configured to receive API calls to specific microservices 112. The API gateway 120 may be configured to provide client authentication and/or access control functionalities to ensure only authorized clients may access the microservices. The gateway may further be configured to accommodate microservice registration to enable tracking of active microservice instances available to receive client requests (e.g. API calls) and to perform routing functions of to dispatch client requests to available microservice instances operating within the computing environment 112.

In FIG. 1 there are N clients, with reference numerals 102-1 through 102-N (collectively, 102). When any one of the clients 102 desire access to the functionalities provided by one or more of the microservices 112, that client 102 can communicate with one or more of the microservices 112 via the API gateway 120. The clients 102 include, but are not limited to, desktop computers, laptop computers, mobile devices, and enterprise clients belonging to external systems. Examples of enterprise clients include, but are not limited to, web applications, call centers, or off-site branch/offices. Communication with the API gateway 120 can be made using any suitable communication method such as wired or wireless communication over a public network such as the Internet or proprietary networks such as a cellular data networks or virtual private networks.

Figure 2:
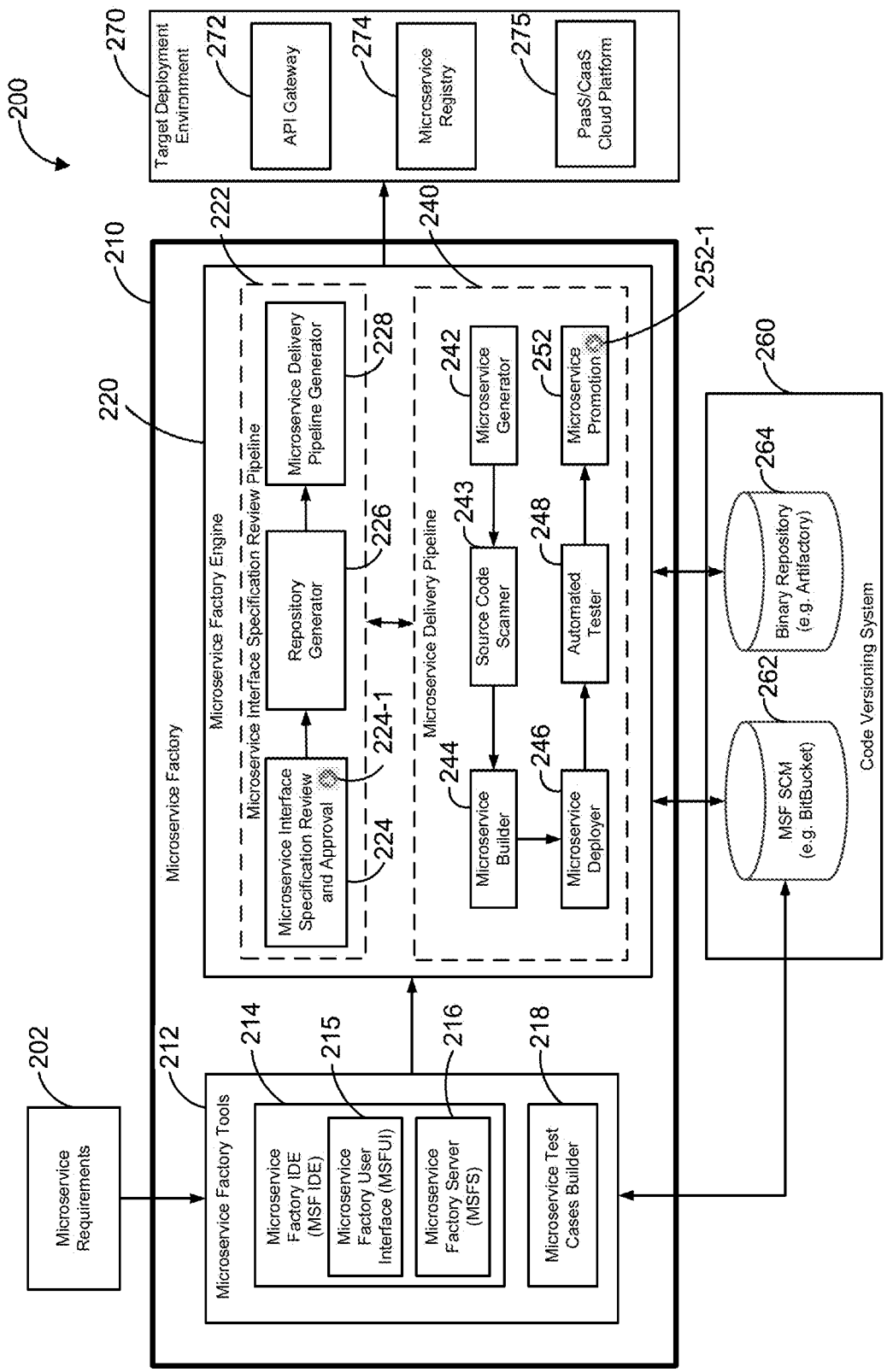
FIG. 2 is a block diagram depicting the architecture of a microservice factory according to at least one embodiment.

FIG. 2 is a block diagram depicting the architecture of a microservice factory platform 200 according to an embodiment of the invention for specifying, generating, verifying and deploying microservices within a target deployment environment 270. The microservice factory platform 200 can be hosted on a local or on-premises computing system or on a distributed or cloud-based environment located remotely at a data center (e.g. Google™ Cloud Services or Amazon™ Web Service). In both cases, the microservice factory platform 200 can be implemented as a server-side application with suitable interfaces to enable communication and data transfer with external hardware and software systems.

A microservice factory ("MSF") 210 contains the elements and pipelines (i.e. processes) to integrate into an existing CI pipeline and deployment regime to efficiently generate the desired microservices. The specification of the microservice, including its operating characteristics, can be defined using microservice requirements 202. A code versioning system 260 is provided to store versioned configuration and API specification data related to the microservice as well as source code and binary artifacts and deployment packages of the microservice. The code versioning system 260 includes a common Source Control Management ("SCM") server 262 and a Binary Repository Manager ("BRM") server 264 to provide microservice source code and binary artifacts version tracking compatible with continuous integration software development principles. Microservices generated by the MSF 210 can be deployed within the target deployment environment 270 for testing and official release. The target deployment environment 270 can be any suitable computing environment to host one or more microservices. As noted previously, the target deployment environment 270 can include, but are not limited to, a Platform as a Service (PaaS) type of cloud computing environment such as Pivotal™ Cloud Foundry™ (PCF), or a Container as a Service (CaaS) cloud computing environment such as Kubernetes™, OpenShift™, and the like.

The service requirements 202 can be captured by microservice designers using standard documentation templates offered by the MSF 210 to help design a specification of a microservice API following industry standard specifications such as OpenAPI™/Swaggerm™. The API specification may be captured in a suitable API definition file format such as YAML. The complete and correct microservice requirements 202 become the input to the MSF 210 for configuring and generating microservices infrastructure capabilities and source code to be compiled and operated within the target deployment environment 270. Each item provided in the microservice requirements 202 can be regarded as a "service artifact", and include a microservice API interface specification OpenAPI™/Swaggerm™ file; a microservice requirement document capturing functional requirements such as the integration pattern, message exchange pattern, business process flow or sequence diagram of each API, validation rule, error rules, etc.; non-functional requirements such as security, availability, throughput, logging, timeout, etc.; and data mapping sheets capturing backend and frontend message layout, mapping rules, and microservice test data. For the purposes of the present disclosure, an "artifact" can be used to refer to any element that helps describe the function, architecture, and design of a software component including microservices for deployment in the target deployment environment 270.

The MSF 210 includes a microservice factory tools component ("MSF tools") 212 and a microservice factory engine component ("MSF engine") 220. The MSF tools 212 provides the components and resources for a user to interact with the MSF 210.

Within the MSF tools 212, a microservice factory integrated development environment ("MSF IDE") 214 provides a suitable microservice factory user interface ("MSFUI") 215 for specifying and inputting the microservice requirements 202 to the MSF 210. For example, a web-based graphical user interface ("GUI") application (e.g. a server application) for managing a microservice delivery project can be implemented to allow users such as project owners to manage the delivery of a particular microservice, including configuration and promotion of the microservice to upper level environments (e.g. from a Development stage to a User Acceptance Test (UAT) stage, and from the UAT stage to a Production stage). The GUI can further be used by users, such as developers of the microservice to invoke one or both processing pipelines within the MSF engine 220 (each described in more detail below) to configure, generate, deploy, and test the microservice generated by the MSF 210. In some embodiments, the MSFUI is configurable to provide a development portal intended for project owners or microservice developers to manage a microservice project or microservice configuration, respectively. For example, the development portal allows project owners to initialize a microservice delivery project (e.g. create a new project) and allows a developer to manage the configuration of a microservice.

A user interface may be provided within the development portal to allow a user to enter microservice configuration details (e.g. the microservice requirements 202). These details include microservice identification data such as the name of the microservice development project, the name of the microservice definition, service version and description; microservice API interface definitions (e.g. as provided in Swagger™); information about the definition of each REST API operation such as API name, universal resource identifier (URI), hypertext transfer protocol (HTTP) method, request and response message schema types, and HTTP return code(s); microservice operation configuration parameters such as the desired service integration patterns to follow (e.g. web service adapter, composition, etc.); defining business logic integration components and the process flow; and configuring the default capabilities of the microservice such as enabling one or more of: service discovery clients, circuit breaker fallback functions to minimize undesirable effects on other services upon failure of the microservice, tracking capabilities, asynchronous messaging, cloud connectors to database services, distributed service transaction tracing, and service transaction data caching.

In some embodiments, the MSFUI is further configurable to provide a microservice lifecycle portal intended for microservice developers to generate and deploy microservices to various testing/staging and production areas of the target deployment environment 270. For example, preproduction areas such as development ("DEV") and Shakedown ("SHK") environments and controlled areas such as User Acceptance Test ("UAT") and Non-Functional Test ("NFT"), and Production ("PROD") environments can be provided. For project owners, this portal provides functionalities to generate and deploy microservices, and promote and approve microservice deployment to target environments of those above-mentioned areas.

In some embodiments, the MSF IDE 214 further includes a microservice factory server ("MSFS") component 216. The MSFS 216 can be deployed as an application to handle requests from the MSFUI 215 and trigger pipelines (i.e. processes) residing within the MSF engine 220, create or update SCM repositories within the SCM server 262, or create or update microservice configuration files and pushed into the SCM repositories within the SCM service 262 on behalf of users. User access to the MSFUI 215 within the MSF IDE 214 can be controlled by the SCM server 262 using single sign on ("SSO"). The user authorization to resources is controlled by SCM's role-based user authorization.

A microservice test cases builder 218 provides an IDE for microservice testers or microservice developers to create test cases to automate the testing of the microservices generated by the MSF engine 220 using an automated tester module 248. Test cases created using the microservice test cases builder 218 can be saved into the code versioning system 260, and more particularly in the SCM server 262 and applied to test the microservice upon generation.

The code versioning system 260 is provided to store information and data relevant to the generation of the microservice such as microservice API Swagger™ files and configuration files. In the present embodiment, the SCM server 262 can be configured to provide SSO sign-in support (as noted above) and further configured to provide versioning support (e.g. for storing versioned source code and other files). The SCM server 262 can be implemented using existing version management tools such as BitBucket' (a distributed source control management system for storing versioned service source code) or other suitable versioning tools. The BRM server 264 can be configured to perform the functions of a binary artifacts management repository for storing versioned snapshots or release binary artifacts. The BRM server 264 can be implemented using existing artifact repository tools such as Artifactory™ by JFrog™.

Within the target deployment environment 270, API gateway 272 provides single entry point for microservice consumers to access to desired microservices. For example, microservices created by the MSF 210 that have been deployed within the production areas of the target deployment environment 270 may be accessible via the API gateway 272. A microservice registry 274 is provided for managing metadata of available microservices at its runtime (e.g. microservice name for discovery, connectivity information, etc.) in the target deployment environment 270 for microservice API runtime discovery purposes, so that the API gateway 272 is able to dispatch a client's API call to an appropriate microservice instance. In the present embodiment, a PaaS/CaaS cloud platform 275 is provided as the targeted deployment platform 10 for microservice to be operable at runtime, for example, PCF, Kubernetes™, OpenShift™, etc. as noted previously.

The MSF engine 220 contains the necessary pipelines (i.e. processes) and components to generate the microservices in accordance with the microservice requirements 202. The MSF engine 220 is built based on CI platform Jenkins™ following CI philosophies to generate, build, deploy, test, and promote microservices.

In the present embodiment, the MSF engine 220 implements two pipelines or processing stages. A microservice interface specification review pipeline 222 is responsible for providing a process for receiving, reviewing and approving the interface specification of the microservice being generated. The microservice interface specification defines the APIs required for exposure of the microservice to, for example, to enable exchange of data/information with clients, other computing components and other microservices within the target deployment 270.

A microservice delivery pipeline 240 is responsible for generating the microservices deployed within the target deployment environment 270 and will be described in greater detail below.

A description of the microservice interface specification review pipeline 222 is now presented in greater detail. A microservice interface specification review and approval module 224 corresponds to a stage and component within the microservice interface specification review pipeline 222 that is operable to validate, automatically, the specifications/requirements including the microservice interface definition OpenAPI/Swagger file (e.g. in the YAML format) intended for deployment within the target deployment environment 270. When supplied with the microservice interface definition Swagger files, the microservice interface specification review and approval module 224 validates the definition against OpenAPI/Swagger specifications and the enterprise microservice API standards established for the target deployment environment 270. Such standards include naming, versioning conventions, and business domain for microservices. More specifically, the service interface specification review and approval module 224 is a governance approval checkpoint that is a part of an automated governance enforcement mechanism of the service delivery platform 200, as indicated by a checkpoint indicator 224-1, which operates as a relevant monitoring stage for SOA service development. If the microservice interface definition does not pass validation (e.g. the interface fails to meet one or more of the enterprise service standards), then the designer of the microservice interface would be notified the service generation process would not permitted proceed further until the interface definition is validated. The imposition of a governance approval checkpoint to maintain CI compliance allows for the production of well-formed standardized services. Notifications can be made, for example, by way of a visual indicator, a message, or both an indicator and a message, via the MSFUI 215 of the MSF IDE 214 for presentation. The microservice interface definition may be modified and subsequently revalidated against established enterprise microservice standards.

Where the microservice interface definition is validated, the project owner or solution architect is notified for further review and approval. This review and approval stage is considered a mandatory governance and approval checkpoint, which can be controlled by the project owner or solution architect for enforcing the microservice specification standards and for ensuring that the microservice design meets particular design standards.

A repository generator module 226 generates the SCM repository in the code versioning system 260 for the microservice by creating the required folders and files based on one or more previously defined repository templates. In the present embodiment, the SCM repository for the source code and files generated for the microservice can be stored into the SCM server 262.

A microservice delivery pipeline generator module 228 corresponds to a stage and component in the microservice interface specification review pipeline 222 that generates (i.e. triggers) the microservice delivery pipeline 240 for a specific microservice to be generated, quality-scanned, built, tested, deployed, and promoted. The configuration of the microservice delivery pipeline 240 can be defined according to one or more pipeline generation templates which set out or define the processing stages to be instantiated and their arrangement. While the repository generator module 226 and the microservice delivery pipeline generator module 228 are depicted as two separate modules, in some embodiments, they can be combined into a single module that can trigger activation of the microservice delivery pipeline 240.

A description of the microservice delivery pipeline 240 is now presented. The microservice delivery pipeline 240 is intended to automate generation of the microservice, including microservice code generation, build, deploy, test, publish, and promotion. The microservice delivery pipeline 240 begins with a microservice generator module 242 which generates the source code and software components necessary to operate the microservice and ends at a microservice promotion module 252 which operates to deploy the microservice for use, for example, within the target deployment environment 270. In one embodiment, the microservice generator 242 may contain a source code generator component (not shown). Alternatively, the microservice generator 242 can be configured to invoke a separate source code generator element. The microservice promotion module 252 is also a governance approval checkpoint, as indicated by a checkpoint indicator 252-1 which operates as a relevant governance monitoring stage prior to the microservice being promoted for deployment in the target deployment environment 270. This check point is also a part of the automated governance enforcement mechanism of the microservice factory platform 200 described earlier with respect to the microservice interface specification review and approval module 224. As noted previously, this pipeline can be triggered from the MSFUI 215 or by polling the SCM repository stored in the SCM server 262 by checking for the completeness of microservice code generation, such as the completeness of the microservice mapping and microservice configuration. In some embodiments, upon completion of a given process, an internal indicator may be switched from a first state to a second state to indicate the completion.

The microservice generator module 242 is a stage and component within the microservice delivery pipeline 240 operable to generate source code and its corresponding shared object code for a desired microservice. As will be described in greater detail below, the microservice generator module 242 outputs two software development projects, one containing shell code corresponding to non-functional capabilities of the microservice and a second project for the microservice developer to insert code corresponding to business logic functionalities of the microservice. In some embodiments, the microservice generator module 242 would be executed only if a license for the MSF engine 220 is validated. In such embodiments, a license service module (not shown) can be provided to authenticate the license prior to executing the microservice generator module 242.

The microservice source code that is automatically generated is created at least in accordance with the microservice requirements 202 provided to the MSF 210, and taking into consideration of the configurations and settings of the target deployment environment 270 (e.g. entered via the development and life cycle portals as described above). Such information can be stored within the SCM server 262 of the code versioning system 260. The code generation can be based on well-known and/or industry-standard service integration design patterns and principles. The generated microservice projects and source code can be saved to the SCM server 262. Upon generation of the projects, the microservice developer may checkout the projects and/or source code saved in the projects from the SCM server 262 to insert code corresponding to the business logic functionalities for the microservice. The developer may then return the projects and/or source code back to the SCM server 262 for the builder described below.

A source code scanner module 243 is a stage and component within the microservice delivery pipeline 240 operable for scanning the generated source code for compliance with various source code quality standards. For example, scans of the source code are conducted to automatically identify for known security flaws, adherence to coding best practices, and to generally obtain a "code smell" as understood by software developers to refer to structures within the code that could be indicative of violations of accepted design principles that may impact design quality in a negative way. The source code scanner module 242 may be configured to run unit tests and may "pass" the source code where the percentage code coverage exceeds a set percentage threshold. Where the scan does not detect any instances of non-compliance, the generated source code may proceed to the next stage in the microservice delivery pipeline 240 to generate a build of the source code. Where the generated code fails code scan conducted by the source code scanner module 243, the source code would not be allowed to proceeding to the next stage of the microservice delivery pipeline 240 (i.e. build generation would be refused). A microservice builder module 244 is a stage and component within the microservice delivery pipeline 240 operable for creating a one or more binary objects or binary build of the shell and integration projects, and including any required data transformation(s) associated with the microservice. More specifically, in the present embodiment, the microservice source code within the shell and integration projects (the latter containing the desired business logic code) saved to the SCM server 262 by the microservice generator module 242 can be retrieved by the microservice builder module 244 and used as the basis for creating the binary build. The microservice builder module 244 is also operable to package the binary microservice build into a distribution file as microservice binary artifacts, then deploy the artifacts into a binary repository manager, such as Artifactory™ noted above, for tracking and versioning. The binary repository manager may store the binary build in the BRM server 264 (a repository for binaries). In some embodiments, the microservice builder module 244 is further operable to perform pre-validation such as determining completeness of business logic code, compliance of code quality, security vulnerability scan, and code coverage. The build process can be terminated if one or more of the pre-validation checks do not pass. Subsequently, users may be notified of the status of the build (e.g. that the binary build was completed successfully, completed but with warnings, did not complete due to errors, and the like). In some embodiments, the microservice builder module 244 may be implemented using the same code base as the microservice generator module 242.

A microservice deployer module 246 is a stage and component within the microservice delivery pipeline 240 operable for deploying the specific files versions of a microservice distribution package with the required access privileges to a desired area within the target deployment environment 270. As noted earlier, the target deployment environment may be divided into different areas for deploying microservices for the purposes of testing/staging and actual use (i.e. production). The areas in the target deployment environment 270 include typical software development life cycle environments such as DEV, SHK, UAT, NFT, and PROD. Similar to the microservice builder module 244, the microservice deployer module 246 can further be configured to conduct pre-validation such as checking for the availability of dependent infrastructure services for the microservice to be deployed (e.g., database service, service registry for discovery, monitoring service, and the like), and post-deployment sanity checks and notify relevant users of the deployment status.

The automated tester module 248 noted previously is a stage and component within the microservice delivery pipeline 240 operable to perform automatic microservice functional tests against a configured backend with test case data. The data applied by the automated tester module 248 can be generated/provided by the microservice test cases builder module 218 and stored in the SCM server 262.

A microservice publisher module 250 is a stage and component within the microservice delivery pipeline 240 operable for publishing metadata relating to the microservice (i.e. microservice metadata), microservice interface definition document, microservice specification document, and data mapping sheets. The information is published to the microservice registry 274 to allow users to discover/review the availability and functionalities of the microservice and for consumer applications to consume or use the service.

The microservice promotion module 252 noted previously is a stage and component within the microservice delivery pipeline 240 operable to promote the microservice for deployment. For example, the microservice promotion module 252 can promote the microservice during its development cycle from the DEV (development) areas to the PROD (production) areas of the target computing environment 270 mentioned previously. In some embodiments, the microservice promotion module 252 includes a built-in governance approval checkpoint controlled by the project owner. Upon the owner's approval based on the satisfactory testing results (e.g. by reviewing the outcome of the automated tester module 248), the source code of the service will be promoted to an upper level branch in the SCM repository of the SCM server 262. In the meantime, the microservice endpoint will be set in the microservice registry 274 and approved for consumption/use.

Figure 3:
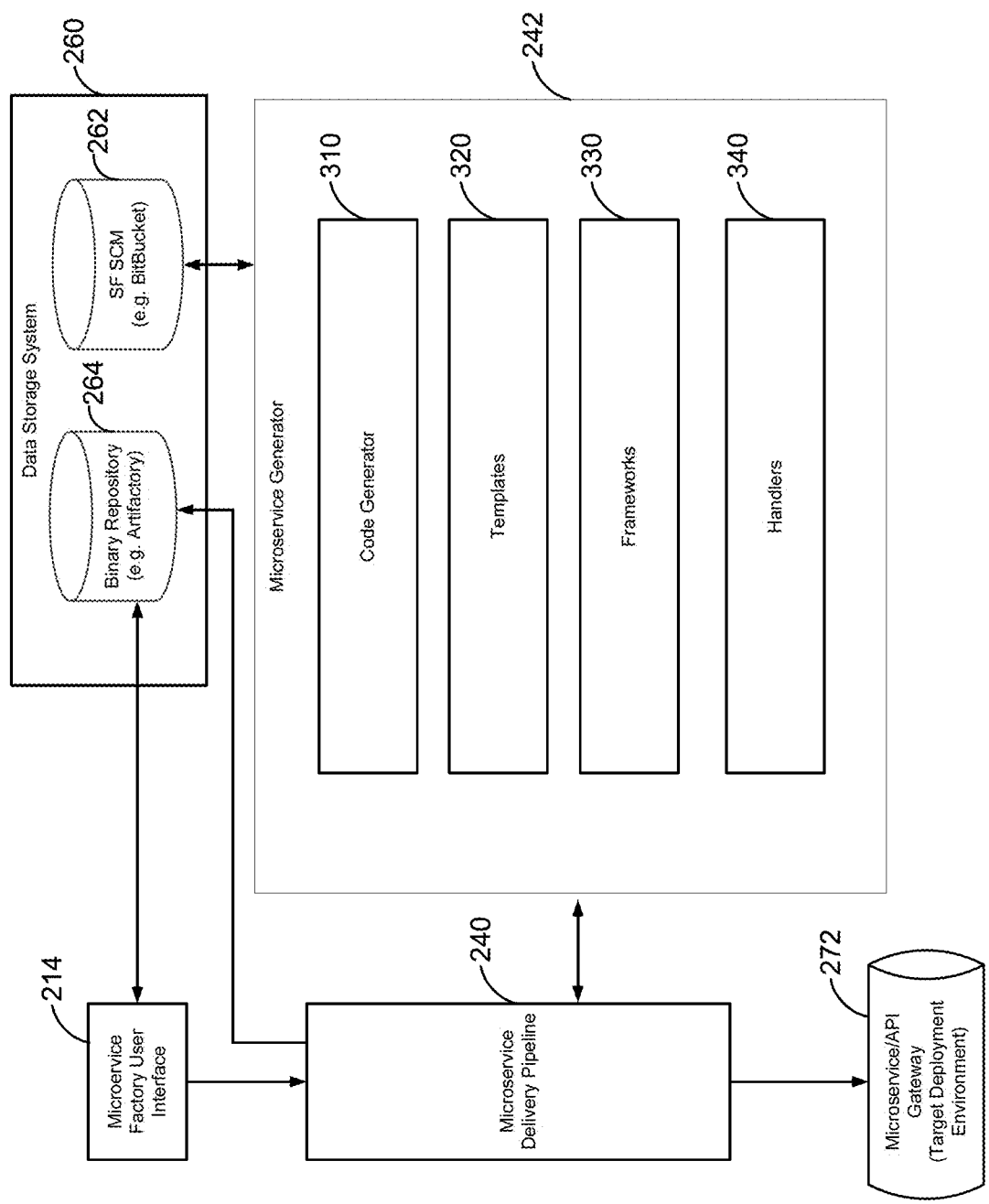
FIG. 3 is a block diagram of a microservice generator module of the microservice factory of FIG. 2.

Referring now to FIG. 3, shown therein is a block diagram of the microservice generator module 242 and some associated components of FIG. 2 provided for ease of reference. The microservice generator module 242 comprises a collection of core components that support the generation of the software development projects and associated source code. More specifically, the microservice generator module 242 is operable to automatically generate microservice source code based on a process flow configuration of the operation of the microservice's API. The process flow for a microservice's API operation is documented as part of the above-described microservice requirements module 202, and inputted by the microservice's developer through a suitable user interface such as the MSFUI 215 of the MSF IDE 214. Such process flow configuration includes, but are not limited to, integration pattern, detailed flow definition, provider service configuration, as well as microservice non-functional capabilities configuration input from the MSFUI 215 of the MSF 210.

Within the microservice generator module 242, the microservice is generated by way of outputting two different software development projects to separate two aspects of the microservice. The software development projects may be coded using a suitable programming language such as Java™, Python™, and the like.

The first project generated by the microservice generator module 242 is a microservice shell project which contains the source code to implement the non-functional capabilities of the microservice and the source code of REST API controllers for exposing the API interface of the microservice, which usually does not require developers to modify. Examples of the non-functional capabilities of a microservice include, but are not limited to, service discovery, service configuration, circuit breaker fallback, circuit breaker metrics aggregator, distributed service transaction tracing, and service transaction data caching. The shell project includes the infrastructure code, mentioned previously, which are used to enable the microservice to integrate and operate within a computing environment. Such infrastructure code is generally complex and harder to write than functional business logic code (described subsequently). The code for the shell project can be generated using code templates defining specific non-functional and/or infrastructure capabilities that have been previously written. Code for certain capabilities can then be instantiated depending on desired capabilities, chosen by the developer, for example, within the development portal interface. The reuse of templated code for implementing infrastructure and/or non-functional in this manner allows all microservice code generated by the disclosed microservice generator module 242 to share the same infrastructure components and speed up microservice development.

The second project is a microservice business logic implementation project, also called an "integration project". This integration project is generated to contain the source code needed for the integration process flow and business logic stub code abstracted out of the integration flow. The particulars of the integration flow can be checked out from the SCM server 262 for developers to fill in the business logic source code in the required source code files following the guidelines provided in the generated code to satisfy the specific business rules for the APIs, such as data transformation, data aggregation, and the like. For example, the source code files can be shell or template source code files containing guidelines for developers to fill in the business logic source code at suitable locations within the source code file.

When the shell and integration projects have been generated, the projects may be saved to the SCM server 262 for retrieval by the microservice developer. Specifically, the developer may check out the projects using a desired software development environment such as Eclipse™ so as to allow the developer to insert specific business logic code to the integration project. The projects can be returned to the microservice delivery pipeline 240 for processing by the microservice builder module 244 to build binaries of the microservice. In some embodiments, since the shell project contains code for infrastructure and non-functional elements that have been previously tested to operate properly and requires no developer input, this project can be "locked" to prevent further changes by the developer. On the other hand, the integration project can be modified, since business logic code is to be inserted by the developer.

The microservice generator module 242 has the flexibility of generating microservices with different layouts, frameworks, libraries and source project management solutions based on users' requirements by configuring the microservice factory engine 220 for different project types. For example, it can generate microservice projects for use in software development project managers such as Gradle™ or Maven™ as required.

In some embodiments, the microservice generator module 242 further supports source code generation with protection features. For example, microservice metadata can be added to the code at the operation/method level written by the code developers to track how this code is used.

In respect of source code generation, the microservice generator module 242 can operate in a number of different modes. In the present embodiment, the microservice generator module 242 is operable in "new", "patch", or "regenerate" modes of operation. Each of the modes will now be described in greater detail.

Under the "new" mode of operation, the microservice generator module 242 is configured to always generate new source code for the configured microservice operations, without protecting the developer's code (e.g. the business logic code). All changes initiated from the MSF framework, other improvements, or API design will be applied. Any code change made by developers for the operation/method of the microservice will be wiped out (i.e. overwritten). This function may be desirable if the microservice design requirement changes so that additional requirements need to be incorporated into or removed from the source code. For example, additional interfaces may need to be added to account for new functionalities or new communication protocols used in the target deployment environment 270 (i.e. same microservice, but with difference interface definitions).

In the "patch" mode of operation, the microservice generator module 242 is configured to keep the existing interface and implementation of the microservice but apply improvements/patches such as security patches for the microservice operational framework or library updates. Changes to microservice operation/method are applied manually by the microservice developers. If no changes to the operation/method are applied, then the microservice generator module 242 will apply the aforementioned solutions to the microservice. This mode of operation automatically preserves business logic code and regenerates/re-assembles code dependencies as required for the business logic code, as needed, based on the security patches or library updates applied to the microservice project. Preservation of business logic code can be carried out by identifying business logic code based on code "fingerprinting" techniques.

Under the "regenerate" mode of operation, the microservice generator module 242 is configured to regenerate the microservice interface and infrastructure components and apply patches/improvements thereto (e.g. security patches for the microservice framework or library updates, and the like) in response to a change to the operation/methods of the microservice (e.g. modification of the business logic code). This mode of operation can be used if a microservice operation/method is changed in a way that the external interfaces also need to be modified (e.g. reconfigured, added, or removed). The regeneration of the external interface can be made in accordance to new API definitions. If a method/operation of the microservice is not changed, the microservice generator module module 242 will apply the patches and regenerate the interface.

Each of the modes of operation can be fine-grained down to the method level of programming language being used, so as to allow microservice developers to precisely improve code quality by applying the latest coding standards or compliance standards, for example, such as applying security patches.

Referring still to FIG. 3, a description of the core components within the microservice generator component 242 is now presented. A code generator module 310 within the microservice generator module 242 is operable to generate source code for the microservice based on service requirements and configuration data obtained, for example, by way of input via the MSF IDE 214. The code generator component 310 is operable in the new, patch, and regenerate modes of operation described above.

The code generator component 310 can be configured to operate in compliance with a desired software integration framework. For example, in the present embodiment, the code generator component 310 includes an SI-based generator (not shown) to generate microservices that use the Spring Integration™ ("SI") framework for Java™ source code. The SI-based generator includes a legacy gateway generator component (not shown) for generating microservices API operation source code from the microservice interface definition WSDL document noted previously for legacy web-based service providers using the Simple Object Access Protocol ("SOAP"), acting as a service gateway to legacy web services. Also included is an integration generator component (not shown) to generate microservice API operation source code for the integration flow based on complex integration patterns within the SI framework, which generally comprises of various back-end provider service calls. Lastly, a shell generator component is included to generate microservice infrastructure source code project based on standard API interface definitions (e.g. defined in an OpenAPI™ or Swagger™ file), and non-functional microservice capabilities.

The code generator component 310 can further include an SB-based generator (not shown) to generate microservice source code following the Spring™ framework, but without Spring Integration™. The SB-generator is named in this manner because it generates source code based on Spring Beans™ (SB). The SB-generator is operable to use command query responsibility segregation (CQRS) patterns. The SB-generator includes a corresponding shell generator and integration generator components (not shown). Alternatively, the SB-generator may be configured to use or share the same shell generator used by the SI-generator. These components operate in a manner similar to corresponding components of the same names associated with the SI-based generator described previously.

An infrastructure generator component (not shown) can be provided within the code generator component 310 as a helper generator to generate library files and other support utilities (e.g. configuration files for the different microservice projects) used in the generated microservices. The infrastructure generator component can also provide generation of additional support code including protection code applied to the code written by the microservice developers.

The foregoing components allow the code generator component 310 to flexibly generate microservices with different layouts, frameworks, libraries and the like, in accordance with different source code project management solutions such as Gradle™ and Maven™, as well as support for version control systems such as Git™ servers. The different modes of operation (e.g. new, patch, regenerate) provide a code generation solution that covers the entire lifecycle of microservices.

A templates component 320 provides templates that describe microservice layout and design, and in which the code generator component 310 use as a basis for its source code outputs. The templates component 320 include skeleton templates such as code patterns which define microservice layouts and fragment templates that define detailed implementations for different scenarios. As noted previously, templates can be used to build source code for the shell projects for implementing infrastructure and non-functional capabilities of the microservice.

The design of the templates establishes a standard for existing and future templates. Templates may be provided for each of the generator components noted above according to the specified software development flow or framework such as the SI or SB frameworks. For example, in the present embodiment, a first set of templates called the "SI-based template" can be provided which describe the layout for the SI-based generator described previously. For each component associated with the SI-based generator, corresponding SI templates are provided. More specifically, legacy gateway templates are provided for the legacy gateway generator component, which describe the layout and detailed implementation of microservice APIs as a legacy service gateway. Integration templates are provided for the integration generator, which describe the layout and detailed implementation of integration pattern based microservice API. Service shell templates are provided for the shell generator component, which describe the layout and detailed implementation of microservice API controllers and microservice infrastructure.

A second set of templates called the "SB-based template" are provided for the SB-based generator component. These templates describe the layout and detailed implementations in CQRS pattern. The use of templates allow for flexibility in customization as well as standardization of microservice solutions and coding practice based on pre-defined design patterns.

A frameworks component 330 is operable to implement common functions and best practices for the generated microservices. The functionalities are intended to enforce uniform standards for all important common cross-cutting concerns (e.g. security, error handling and logging) and relieve developers from coding common functions, thereby saving time. These functions include implementation of common security-related functions to enforce accepted security standards and make security implementation details transparent to microservice developers. Logging frameworks are included to implement enterprise standard logging solutions and allow integration of the logging functions with enterprise-wide monitoring solutions. Error handing frameworks are provided to enable enterprise standard error handling strategies. A utilities framework is provided to enable provision of code stubs that follow best practices for common features.

A handlers component 340 is operable to manage the different aspects of the microservice generation process by the code generator component 310. In the present embodiment, various components (not shown) reside within the handlers component 340 that provide management and support features. A description of the elements within the handlers component 340 is now presented.

Included within the handlers component 340 is a configuration handler used to provide transparent read/write of metadata during the microservice generation procedure. A repository handler component provides transparent access to the data storage such as the SCM server 262 (e.g. for retrieving microservice configuration information and saving the generated shell and integration projects). A dynamic source code processor component is included to provide shared source code parsing and modification function. A generation tracer component enables facilitates the various types of code generation/re-generation described above and to provide protection for the developers' code (e.g. business logic code) as required. A data source handler module is included to provide support functions regarding management of various data sources. A deployer component provides deployment related support functions. Lastly, a generator factory component provides flexibility of generator creation scenarios. The foregoing components within the handlers component 340 provide isolation of concerns, so as to ensure robust and resilience within code generating solution.

The examples and corresponding diagrams used herein are for illustrative purposes only. Different configurations and terminology can be used without departing from the principles expressed herein.

Although the invention has been described with reference to certain specific embodiments, various modifications thereof will be apparent to those skilled in the art without departing from the scope of the invention. The scope of the claims should not be limited by the illustrative embodiments set forth in the examples, but should be given the broadest interpretation consistent with the description as a whole.

The invention claimed is:

1. A method to automatically generate a software microservice operable in a computing environment, the method comprising:

receiving a configuration specification defining the software microservice, the configuration specification comprising a functional requirement and a non-functional requirement;

validating the configuration specification;

selecting at least one pattern template from a first group of templates based on the non-functional requirement of the validated configuration specification;

selecting at least one pattern template from a second group of templates based on the functional requirement of the validated configuration specification;

outputting a first set of source code for a first software project corresponding to a first aspect of the software microservice using the at least one pattern template selected from the first group of templates;

outputting a second set of source code for a second software project corresponding to a second aspect of the software microservice using the at least one pattern template selected from the second group of templates, wherein the second software project is configured to implement at least one data transformation rule for transforming data received by the software microservice; and generating the software microservice based on the first set of source code and the second set of source code.

2. The method of claim 1, wherein the first set of source code implements at least one computing system interface for the software microservice for communicating with a component of the computing environment.

3. The method of claim 2, wherein the computing system interface is an application programing interface (API).

4. The method of claim 1, wherein the first software project is a locked project such that a user is not permitted to make changes to the project.

5. The method of claim 1, wherein the templates describe at least one of microservice layouts, integration flow, and designs.

6. The method of claim 1, wherein the first group of templates is for use in a first software development framework, and the second group of templates is for use in a second software development framework.

7. The method of claim 1, wherein the second software project is configured to receive a third set of source code for incorporation into the second software project, the third set of source code defining at least one function of the microservice.

8. The method of claim 7, wherein the third set of source code is provided by a developer of the software microservice.

9. The method of claim 1, further comprising building the first software project and second software project to a single binary object corresponding to the software microservice.

10. The method of claim 9, further comprising testing the software microservice upon deploying the binary object.

11. A system to automatically generate a software microservice operable in a computing environment, the system comprising:

a microservice interface specification review pipeline operable to receive a microservice interface specification defining the software microservice; and a microservice delivery pipeline operable to:

validate a configuration specification of the software microservice;

select at least one pattern template for the software microservice from a first group of templates based on a non-functional requirement defined the validated configuration specification of the software microservice;

select at least one pattern template for the software microservice from a second group of templates based on a functional requirement defined by the validated configuration specification;

output a first set of source code for a first software project corresponding to a first aspect of the software microservice using the at least one pattern template selected from the first group of templates;

output a second set of source code for a second software project corresponding to a second aspect of the software microservice using the at least one pattern template selected from the second group of templates, wherein the second software project is configured to implement at least one data transformation rule for transforming data received by the software microservice; and generate the software microservice based on the first set of source code and the second set of source code.

12. The system of claim 11, wherein the microservice delivery pipeline is generated based on one or more pipeline generation templates.

13. The system of claim 11 further comprising a microservice source code generator, the source code generator being invokable by the microservice delivery pipeline to generate the first set of source code and the second set of source code.

14. The system of claim 11 further comprising a code versioning system to store the first software project and the second software project.

15. The system of claim 11 further comprising an integrated development environment (IDE) providing a graphical user interface (GUI) for inputting the microservice interface specification and the configuration specification.

16. The system of claim 11, wherein the IDE is further configurable to invoke at least one of the microservice interface specification review pipeline and the microservice delivery pipeline.

17. The system of claim 11 wherein the IDE is a web-based IDE that comprises a web-based GUI provided by an associated server application.

18. The system of claim 11, wherein the microservice interface specification review pipeline triggers generation of the microservice delivery pipeline.

19. The system of claim 11, wherein the service delivery pipeline is further operable to build the first software project and the second software project to binary objects corresponding to the software microservice.

20. The system of claim 11, wherein the first set of source code implements at least one computing system interface for the microservice for communicating with a component of the computing environment.

21. The system of claim 20 wherein the computing system interface is an application programing interface (API).

* * * * *